Feb. 7, 1956
H. B. SOULE ET AL
2,734,156
INDEXING MECHANISM AND INDEXING CONTROL
FOR MOTOR DRIVEN TURRET LATHES
Original Filed Jan. 4, 1949
2 Sheets-Sheet 1
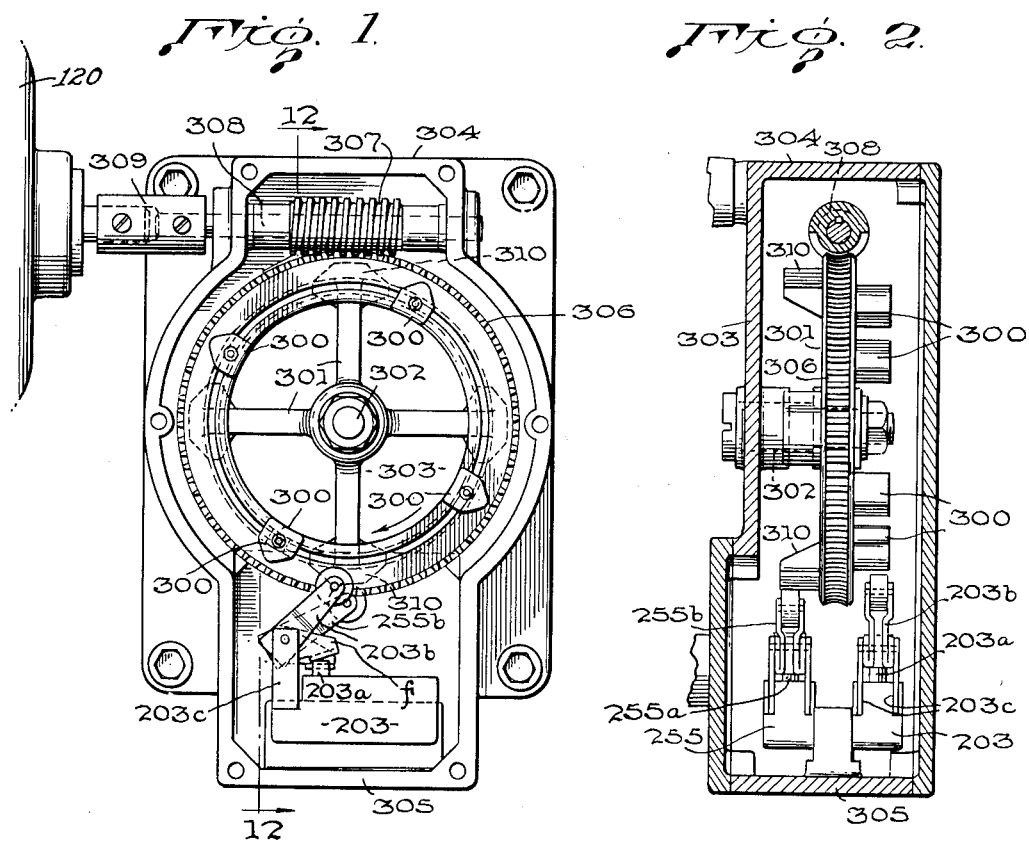
INVENTORS
HAROLD B. SOULE
GORDON W. SMITHSON
BY
Joseph J. Schofield
ATTORNEY

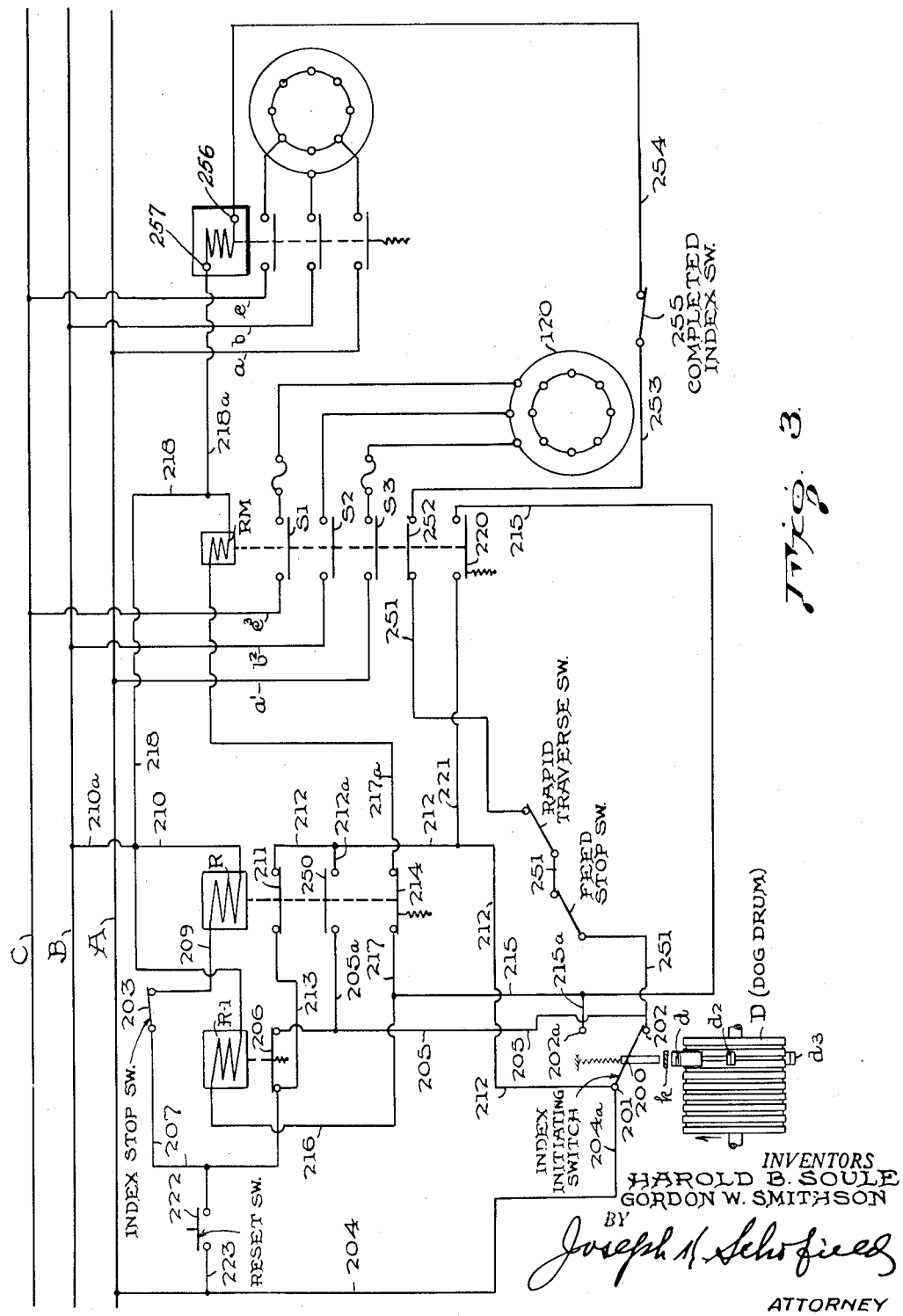

United States Patent Office 2,734,156
Patented Feb. 7, 1956

2,734,156

INDEXING MECHANISM AND INDEXING CONTROL FOR MOTOR DRIVEN TURRET LATHES

Harold B. Soule, Barrington, and Gordon W. Smithson, Pawtucket, R. I., assignors, by mesne assignments, to Pratt & Whitney Company, Incorporated, West Hartford, Conn., a corporation of Delaware Original application January 4, 1949, Serial No. 69,184, now Patent No. 2,669,006, dated February 16, 1954. Divided and this application March 26, 1952, Serial No. 278,824

11 Claims. (Cl. 318—39)

This invention relates to machine tools such as turret lathes, and more particularly relates to circuits for the control of the turret indexing mechanism.

A principal object of our invention is to provide an improved turret indexing mechanism which is not only capable of indexing effectively and satisfactorily turrets of the medium and smaller sizes but is also capable of indexing smoothly, quickly and positively into precision positions turrets of large sizes and turrets carrying heavy tools; and to provide circuits controlling indexing mechanism of this character which will control indexing the turret to precision indexed positions in accordance with a predetermined cycle of operations.

Another object of this invention is to provide a control for a turret indexing motor whereby the turret may be indexed to any one of its indexible positions from any other index position without requiring traverse feed of the turret or its slide; and another object of this invention is to provide a turret index motor control which operates automatically to index the turret to the desired index stations in the sequence desired, the control preferably being settable whereby the stations desired and the desired sequence may be preselected.

Another object of this invention is to provide turret index motor control so associated with a control of the rapid traverse motor of a turret lathe that the rapid traverse motor will not operate while indexing of the turret is taking place.

A further object of this invention is to provide a turret indexing motor control which is positive, quick and reliable in action and is quickly, positively and reliably responsive to either manual or automatic actuation.

Other objects of this invention will be in part obvious and in part pointed out hereinafter.

The control for the turret index motor is electrical and includes dogs on a control dog-wheel shown in Figs. 1 and 2 and a dog or dogs on the dog-drum of the machine shown in Fig. 3, the dogs operating to adjust switches in the motor circuit to start and to stop the index motor to index the turret to the desired index stations in the desired sequence; this control preferably so controlling switches in a circuit to the rapid traverse motor (or its equivalent) of the machine that said rapid traverse motor cannot start while the indexing motor is running.

The invention accordingly consists in the features of construction, combinations of elements, arrangements of parts and methods of operation which will be pointed out hereinafter and the scope of the application of which will be set forth in the claims that follow.

In order that a clearer understanding of this invention may be had, attention is hereby directed to the accompanying drawing, forming a part of this application and illustrating certain possible embodiments of this invention, and in which:

Figure 1 is a side elevation of the assembly of control dog-wheel and its drive and associated switches of the index control, the outer cover of the assembly housing being removed;

Figure 2 is a sectional view of the device shown in Fig. 1 and is taken on the line 2—2 of Fig. 1; and Figure 3 is the circuit layout and wiring diagram of the control.

Similar reference characters refer to similar parts throughout the several views of the drawings.

This application is a division of our application Serial No. 69,184, filed January 4. 1949, now Patent No. 2,669,006.

This invention relates broadly to machine tools and particularly to automatic turret lathes but, since the invention is specifically related to turret indexing mechanism and its control, it is deemed unnecessary to illustrate an entire machine tool and, therefore, in the drawings there is shown only as much of the automatic turret lathe mechanism as is required to fully and clearly illustrate the features of construction, combinations of elements and arrangements of parts which may constitute one possible embodiment of this invention. For a complete understanding of the entire machine reference may be made to the above referred to patent.

The present invention provides suitable control means for stopping the indexing motor 120 when the turret has been indexed to the desired position; and this indexing may be to the extent of one or any number of turret faces sequentially or otherwise. In other words, the control may be set accordingly to carry out automatically the indexing of the turret in the manner desired or required without necessarily indexing the turret one face for each reciprocable movement of the turret-slide. As stated, the turret indexing is initiated by the rotatable dog drum D of the machine—which may be of any usual type driven synchronously with the turret-slide movements and preferably from the spindle or the spindle drive (not shown) of the machine in a manner well understood by persons familiar with automatic machine tools and as shown in U. S. Patents Nos. 1,881,928 and 2,357,396, as examples—and is provided with adjustable dogs $d$ that are brought to engage and operate a switch 200 to close it across switch contacts 201 and 202$a$ to establish a circuit to the index motor 120, as shown in Fig. 13 (this switch being normally biased to close across its contacts 201 and 202).

As is most always the case in automatic turret lathes, the turret-slide is returned from its forward feed or cutting positions by a fast motion, usually referred to as "rapid traverse," to its rearmost position for the indexing of the turret, where the turret indexing takes place. This fast motion or rapid traverse of the turret-slide and the motion of its driving parts or mechanism is brought to a stop by the present invention when the indexing of the turret is begun or initiated by the dog $d$ on the dog drum D. On the other hand, the indexing of the turret, and therefore the operation of the indexing motor 120, is stopped by an index-stop-control designated 304, by the switches and electrical circuits shown in Figs. 1, 2 and 3.

As best shown in Figs. 1 and 2 the index-stop-control 304 comprises a casing in which is disposed a dog wheel 301 rotatably mounted on a stud shaft 302 fixed to the wall 303 of the casing which is supported on the base 20 of the machine. An index-stop-switch 203, of the push button type, is mounted on the base 305 of the casing 304 and has its button portion 203$a$ actuated by an arm 203$b$ pivoted in a bracket 203$c$. The arm 203$b$ has a finger $f$ arranged to depress the button 203$a$ to open the switch 203, when arm 203$b$ is operated by a dog 300 on dog wheel 301, and releases said button 203$a$ to close switch 203, when arm 203$b$ is not being effectively operated by said dog or dogs 300. Dog wheel 301 is formed with worm gear teeth 306 and is rotated by the index motor through a worm 307 fixed to a shaft 308 which is coupled, as at 309, to the shaft of index motor 120. One or more of the dogs 300 may be adjustably secured on and about the dog wheel 301 as are desired (but not more than there are turret faces or turret indexing positions on a given machine). There are four (4) of such dogs 300 shown in Figs. 1 and 2 because the machine shown in the above referred to patent has four (4) faces; however, as just stated, a less number of dogs 300 may be provided, when setting-up the machine, according to the number of index positions of the turret that are to be employed during the cycle of the machine for a given working operation during said cycle. The drive for indexing the turret and the dog wheel 301 and their drives (both from the motor 120) are so relatively proportioned and synchronized that, for one complete revolution of the dog wheel 301, the turret is also rotated a full revolution; that is, the turret is indexed through all intermediate index stations and back to the initial index station. By providing and properly adjusting one or more index-stopping-dogs 300 on and about the dog wheel 301, the index motor may be stopped and the indexing of the turret discontinued at any preselected one or successive faces or stations of the turret for performing work or cutting operations.

Obviously, if only one dog 300 is provided on the dog wheel 301 and the index motor 120 is started, the turret would be indexed through as many faces or indexed positions according to the position of said single index-stop-dog 300 on said wheel 301 before the index motor 120 is stopped. Thus, in the present invention it is possible to skip one or more faces of the turret when indexing the turret and while its slide is at rest.

When skipping turret faces, as just explained, the index motor 120 will continue operation until stopped by an indexing-stop-dog 300 on wheel 301 opens switch 203 to de-energize index motor 120.

Also provided on the dog wheel 301 are "completed-index" dogs 310, and in the broad aspect of the invention, there being at least as many such dogs 310 as there are dogs 300 to contact a switch arm 255b to close a switch 255 to rapid traverse motor TM starting the latter, after indexing of the turret has been discontinued. However, in the present embodiment of the invention, as shown, there are as many "completed index" dogs 310 fixed on the dog wheel 301 as there are turret faces or index positions or stations of the turret, one of said dogs being located on the dog wheel to correspond with each index position of the turret, respectively, and are adapted to contact switch arm 255b to close a rapid traverse safety switch 255 after each turret index position or station has been reached so as to allow the rapid traverse motor TM to operate the driving mechanism of the turret slide (not shown, but well known in the art) and, consequently operate the dog drum D; but, should there be no index-stop-dog 300 on wheel 301 at any turret index position or station just preceding a dog 310, the closing of switch 255 is ineffective to start the rapid traverse drive or motor TM and the indexing of the turret continues. The operation of the dogs 310 upon switch 255 will be later described. Switch 255 is identical with switch 203 and its detailed construction need not be repeated except that the push button 255a of switch 255 closes said switch 255, when depressed by the arm 255b being engaged by a dog 310, whereas such operation of push button 203a opens switch 203. In the present embodiment, the "completed-index" dogs 310 may remain in position on the dog wheel 301 and therefore are referred to as fixed, while index-stop-dogs 300 may be omitted and replaced on the wheel 301 according to the set-up of any given operation of the machine.

*Operation of control*

With the contacts 201 and 202 closed by the index-initiating-switch 200 (see Fig. 3), as when this switch is not being operated by dog d of dog drum D (i. e., while the turret-slide is performing certain of its operations as when in its feed movements or is in its rapid traverse motions to and from its feed positions and a dog 310 on dog wheel 301 is holding completed-index-switch 255 closed), the current passes from power line A through conductors 204, 204a, switch contacts 201, 202, conductor 251, normally closed interlocks switch 252, conductor 253, "completed-index" switch 255, conductor 254, terminal 256 of switch-box TS of the rapid traverse motor TM and from the other terminal 257 of said switch-box TS through conductors 218a, 218 and 210a to power line B, and, since rapid traverse motor TM is fed by lines a, b and c from power lines A, B and C, respectively, through switch-box TS, rapid traverse motor RTM is operating the dog drum D and, consequently, the turret-slide is being reciprocated on its way. It may be noted that a "feed stop" switch and main "rapid traverse" switch, and possibly others, may be interposed in conductor 251 and controlled by the dog drum D or manually, or both, for purposes well understood in the art but they are not a part of the present invention. Moreover, when switch 200 is closing contacts 201 and 202, as just mentioned and as shown, current passes from conductors 251 and 205, normally closed interlock switch 206, conductor 207, normally closed indexing-stop-switch 203, conductor 209, relay R and conductors 210 and 210a to the other power line B, thus energizing control relay R.

When energized, relay R closes (as shown) a normally open interlock switch 211 and thereby establishes a holding circuit to this relay R, which circuit by-passes switch 200, and current flows from line A through conductors 204, 204a, 212, closed interlock 211 and thence through conductor 213 to conductor 207, which, as stated, is connected through normally closed index-stop switch 203 and relay R to power line B. Relay R, when energized, also opens interlock switch 250 in said by-pass circuit to the rapid traverse motor TM and, further, closes an interlock switch 214 in a circuit to an index-motor-starting relay RM, thus conditioning said latter circuit to energize relay RM when index-initiating switch 200 is thrown to close contacts 201—202a.

As above stated and with the control in this position as shown in Fig. 3, the turret-slide will be either in its feed motion or, if the rapid traverse motor TM is running, is in its rapid traverse motion, unless said slide has been otherwise stopped by other means not shown. Now assuming the turret slide is in rapid traverse motion and moving toward its rearmost or turrent indexing position and just as said position is reached, a dog d on dog drum D throws index-initiating switch 200 to open contacts 201 and 202 and to close contacts 201—202a, thereby energizing index motor relay RM (while relay R is still held energized by its holding circuit), the current passing through conductors 204, 204a, switch contacts 201, 202a, conductors 215a, 215, 217, switch 214, and conductor 217a to relay RM and thence through conductors 218 and 210a to the other power line B; and, at the same time, by said operation of index-initiating switch 200, a relay R-1 is energized to open the direct circuit to control relay R (through contacts 201 and 202, conductors 205 and 207, index stop switch 203 and conductor 209) without breaking its holding circuit so that, after relay R is de-energized by opening of index-stop switch 203, and its holding circuit broken, relay R cannot be re-energized—and thereby condition the index relay RM or permit power operation of the index motor 120—until the dog d on dog drum D or manually operated key k has released index-initiating switch 200 from contacts 201 and 202a and switch 200 has returned to bridging contact with contacts 201 and 202.

Relay RM, now being energized, closes normally open switches S', S² and S³ in the power line to the index motor 120 and starts it, there being three conductors a', b² and c³ leading respectively from the three power lines A, B and C to said motor 120, and said switches S', S² and S³ being in each of the conductors. Relay RM, when so energized, also opens another interlock 252 in the circuit of the rapid traverse motor RTM stopping said motor, if running, and also closes an interlock switch 220 that establishes a holding circuit through relays RM and R–1 around switch 200 should the dog $d$ on dog drum D overrun and release switch 200 from bridging contact with contacts 200 and 202a, said holding circuit including conductors 204a, 212, 221 leading to one side of switch 220 (now closed) and conductor 215 leading from the other side of the switch 220 to conductor 217 then through closed switch 214 and conductor 217a to the relay RM and also through conductor 216 to relay R–1. Thus, relay RM will remain energized so long as relay R is energized and conditioning interlock switch 214 remains closed after index-initiating switch 200 has bridged contacts 201 and 202a, even though contacts 201 and 202a of switch 200 are disconnected by overrunning of the dog drum D; and relay R–1 remains energized so long as relay RM is energized or as long as switch 200 remains in bridging contact with contacts 201 and 202a so as to prevent re-energization of relay R, after each opening and closing operation of index-stop switch 203, until index initiating switch 200 has again bridged contacts 201 and 202. Also, just as the turret indexing motor 120 is started, it rotates dog-wheel 300 to move a dog 310 out of contact with switch arm 255b, thus releasing "completed index switch" 255 and allowing it to open. The switch 255 remains open until operated by the next dog 310 at the completion of the turret index, which has just now begun.

The index motor 120 will now continue to run as long relay RM remains energized and turret indexing continues for as many turret faces, positions or stations for which the machine has been "set-up" by the position of dogs 300 on the dog-wheel 301.

Just as each turret indexing operation is completed, a properly adjusted dog 300 opens switch 203 momentarily to allow the following operations and to stop index motor 120—namely, opening switch 203 breaks the circuit to relay R, de-energizing it, which causes holding circuit interlock switch 211 of relay R to open and conditioning switch 214 in the circuit of relay RM to open, thus breaking the holding circuits of these relays R and RM; closes interlock 250 to condition a by-pass circuit to the rapid traverse switch box TS through conductor 212, 212a, 205a, 205, 251, 253, and 254; de-energizing relay RM causes powerline switches S', S² and S³ to open cutting-off power to the indexing motor 120; opens interlock 220 breaking the holding circuit to relay R–1, which de-energizes and closes interlock 206 to condition main feed circuit (204, 204a, 201, 202, 205, 207 and 209) to re-energize relay R when index-stop switch 203 closes and should index-initiating switch 200 be bridging contacts 201 and 202; and also closes conditioning interlock 252 in the rapid traverse motor control circuit—and, with these operations having been completed, the index motor 120 is allowed to coast sufficiently to rotate dog wheel 301 a short distance so as to disengage the dog 300 from the switch operating arm 203b and allow said switch 203 to close and so as to bring a succeeding "completed-index" dog 310 into contact with arm 255b and close "completed index" switch 255 in the rapid traverse motor circuit, said dog wheel 301 coming to rest in this position and maintaining switch 255 closed.

With the relays and switches in the condition just stated, the index motor 120 is stopped and the rapid traverse motor TM is now started and the turret-slide cam drum 21 and the dog drum D start to operate if the dog $d$ of dog drum D has previously released switch 200 to open contacts 201 and 202a and to bridge its contacts 201 and 202 (unless other means, not shown, have caused the machine or the turret-slide movements to stop) and thereby also causing relay R to become re-energized and, consequently, its holding circuit re-established and the switch 214 to again close to condition the circuit to relay RM for the next turret indexing operation to be initiated by the next dog $d^2$ on dog drum D or by manual key $k$. It should be noted, however, that, when switch 203 was opened by dog 300, relay R was momentarily de-energized until dog 300 passed switch arm 203b, but this caused switches 211 and 214 to open breaking the holding circuits to relay R and to the index motor relay RM, so that even after switch 203 has reclosed, as above mentioned, the index motor 120 will not start again until and unless the index-initiating switch 200 has been closed again across contacts 201 and 202a, either by a dog on the dog drum D or by a manually operable key or lever $k$. However, after relays R and RM were de-energized by the opening and closing of index-stop switch 203, as stated in the preceding paragraph, should the dog $d$ on dog drum D not have released the index-initiating switch 200 to open contacts 201 and 202a and bridge contacts 201 and 202, the relay R–1 will remain energized from contact 202a through conductors 215 and 216 (thus holding interlock 206 open to prevent relay R from becoming re-energized and closing switch 214 and thereby energizing index relay RM to start another index operation) and the circuit to the rapid traverse switch box TS will not have been closed by switch 200; but, since interlock 250 is closed when relay R is de-energized, current may pass through by-pass circuit (204a, 212, 212a, 250, 205a, 205) to conductor 251 of the circuit to the rapid traverse switch box TS (as interlock 252 and "completed index" switch 255 are now closed) to start rapid traverse motor to operate and thereby cause dog drum D to move dog $d$ to release switch 200 so as to bridge contacts 201 and 202, whereby relay R is re-energized, relay R–1 de-energized and rapid traverse motor TM continues to run until another turret indexing operation is initiated by a dog on dog drum D or manual key $k$ or other controls of the machine (not shown) are brought into play.

In the event of power failure before an indexing operation has been completed, and switch 200 is still bridging contacts 201 and 202a power may be restored to relay R by closing a manually operable reset push-button switch 222 in a conductor 223 connecting conductor 204 to conductor 207, and hence to relay R. Energizing relay R closes interlock 214 which completes the circuit to index relay RM (if switch 200 is bridging contacts 201 and 202a) thus starting the index. If power fails before an indexing operation has been completed, and switch 200 is bridging contacts 201 and 202, relay R is automatically energized, when power is restored, and operating switch 200 manually will restart the index as before described. It will be observed that the above described safety controls provide against the index motor 120 being started while the rapid traverse motor TM is running and vice versa because—since relays R and RM are energized when the index motor 120 is running and switches 250 and 252 are held open, as explained above—the rapid traverse motor circuit will remain open even though "completed-index" switch 255 becomes closed and that the closing of the circuit to the rapid traverse motor switch box TS requires the de-energizing of relay R to open interlock 214, which de-energizes relay RM to close interlock 252 in the rapid traverse control circuit.

Conversely, as soon as the index motor 120 starts and indexing operation begins, the dog wheel 301 moves the "completed-index" dog 310 from the "completed-index" switch 255, thus opening said switch and preventing actuation of the rapid traverse motor until "completed index" switch 255 is again closed by one of the dogs 310 on the dog wheel 301, after a de-energization of relays R and RM.

While the disclosure therein is shown for convenience in connection with a four (4) faced turret and having four switch operating cams on the dog wheel 301, it can be applied to machines having turrets of more or less faces, but an advantage of the present invention is that the manufacturer may make a machine of one size with the usual maximum number of turret faces—which is usually six faces—because the dog wheel 301 can be set up with only the proper number of dogs 300 in order that the turret will be indexed to use only the number of turret faces as the tooling of the machine requires. The same turret face can be brought to the spindle a second time or more by merely omitting dog d from dog drum D.

It is to be understood that the specific embodiment of the present invention as herein shown and described is for the purpose of showing one (and at the present time the preferred) example thereof because the invention is capable of modification without departing from the spirit and principle thereof and that the invention is not to be limited except by the scope of the appended claims.

That which is claimed, as new, is:

1. A control for an automatic power-driven machine having an indexing member cyclically driven by an indexing motor and having a tool carriage cyclically driven by a traverse motor, said control comprising a traverse-motor relay in control of the power to the traverse motor; an indexing-motor relay in control of the power to said indexing motor, the traverse-motor relay being interlocked through the indexing-motor relay to permit energizing of the former only when the latter is deenergized; an indexing-initiating switch operated by the traverse motor to momentarily close the indexing-motor relay at the end of each tool-carriage cycle; a hold-circuit in said indexing-motor relay for maintaining the latter closed; a control relay in said circuit for opening said hold-circuit; an index-stop switch for actuating said control relay, said stop switch being operated by the indexing motor to break the hold-circuit when the indexing cycle is completed, the opening of the indexing-motor relay reenergizing the traverse-motor relay; and relay means in series with said last mentioned switch for preventing the control relay from reenergizing the indexing-motor relay while the indexing-initiating switch is operative.

2. In a control as set forth in claim 1, a second switch operated by the indexing-motor and in series with the traverse-motor relay for preventing the traverse-motor relay from being energized except when the indexing member is properly indexed, and said traverse-motor relay being also interlocked with said indexing-initiating switch to prevent energizing of the former when the latter is operative.

3. In a control as set forth in claim 1, said indexing-motor relay being closed only when said control relay is closed, said control relay having a self-closing circuit and having a self-holding circuit in series with said stop switch, and said relay means being in series with said self-closing circuit to maintain the latter open while said relay means is energized.

4. A control for an automatic power-driven machine having an indexing member intermittently driven by an indexing-motor and having a tool carriage driven by a traverse motor, said control comprising a traverse-motor relay in control of the power to the traverse motor; an indexing-motor relay in control of the power to said indexing-motor, the traverse-motor relay being controlled by the indexing-motor relay to energize the former when the latter is deenergized; an indexing-initiating switch operated by the traverse motor to close the indexing-motor relay when the tool carriage is in a rest position; a hold-circuit in said indexing-motor relay for maintaining the latter closed; a control relay in said circuit for opening said hold-circuit; an index-stop switch for actuating said control relay, said stop switch being operated by the indexing motor to break the hold-circuit when the indexing cycle is completed, the opening of the indexing-motor relay reenergizing the traverse-motor relay.

5. In a control as set forth in claim 4, a second switch operated by the indexing motor and in series with the traverse-motor relay for preventing the traverse-motor relay from being energized except when the indexing member is properly indexed.

6. In a control as set forth in claim 4, said indexing-motor relay being closed only when said control relay is closed, and said control relay being closed except when said stop switch is actuated.

7. A control for an automatic power-driven machine having an indexing member driven by an indexing-motor and having a tool carriage driven by a traverse motor, said control comprising a traverse-motor relay in control of the power to the traverse motor; and indexing-motor relay in control of the power to said indexing motor; said motor relays being interconnected to permit energizing of only one relay at a time; an indexing-initiating switch operated by the traverse motor to close the indexing-motor relay when the tool carriage is clear of the indexing member; a hold-circuit in said indexing-motor relay for maintaining the latter closed; a control relay in said circuit for opening said hold-circuit; an index-stop switch for actuating said control relay, said stop switch being operated by the indexing motor to break the hold-circuit when the indexing cycle is completed, the opening of the indexing-motor relay reenergizing the traverse motor relay.

8. In a control as set forth in claim 7, a second switch operated by the indexing motor and in series with the traverse-motor relay for preventing the traverse-motor relay from being energized except when the indexing member is properly indexed, and said traverse-motor relay being also interlocked with said indexing-initiating switch to prevent energizing of the former when the latter is operative.

9. In a control as set forth in claim 7, a manually-operated reset switch to reenergize said control relay to reclose said indexing-motor relay in the event of a power failure during the portion of the operation of the machine in which the indexing motor is operating.

10. A control for an automatic power-driven machine having an indexing member intermittently driven by an indexing-motor and having a tool carriage alternately intermittently driven by a traverse motor, said control comprising a traverse-motor relay in control of the power to the traverse motor; an indexing-motor relay in control of the power to said indexing motor, said motor relays being interlocked to prevent simultaneous energizing of both relays; an indexing-initiating switch operated by the traverse motor to close the indexing-motor relay at the end of each tool carriage cycle; a hold-circuit in said indexing-motor relay for maintaining the latter closed; an index-stop switch operated by the indexing-motor to break the hold-circuit when the indexing cycle is completed, the opening of the indexing-motor relay reenergizing the traverse motor relay.

11. In a control as set forth in claim 10, a second switch operated by the indexing motor and in series with the traverse-motor relay for preventing the traverse-motor relay from being energized except when the indexing member is properly indexed, and said traverse-motor relay being also interlocked with said indexing-initiating switch to prevent energizing of the former when the latter is operative.

References Cited in the file of this patent

UNITED STATES PATENTS

| | | |
|---|---|---|
| 2,029,335 | Oberhoffken et al. | Feb. 4, 1936 |
| 2,497,842 | Armitage et al. | Feb. 14, 1950 |